United States Patent [19]

Paltrinieri

[11] Patent Number: 5,546,733
[45] Date of Patent: Aug. 20, 1996

[54] METHOD AND AN APPARATUS FOR REGISTERING A LEVEL OF CONTENTS

[75] Inventor: Roberto Paltrinieri, Modena, Italy

[73] Assignee: Tetra Laval Holdings & Finance S.A., Pully, Switzerland

[21] Appl. No.: 408,351

[22] Filed: Mar. 22, 1995

[30] Foreign Application Priority Data

May 9, 1994 [IT] Italy .................................. MI94A0903

[51] Int. Cl.⁶ ............................... B65B 1/36; B65B 9/06; B65B 57/10
[52] U.S. Cl. ............................... 53/503; 53/440; 53/451; 53/551; 141/95
[58] Field of Search ....................... 53/440, 503, 504, 53/77, 55, 52, 451, 551; 141/95, 198, 82

[56] References Cited

U.S. PATENT DOCUMENTS

| | | | |
|---|---|---|---|
| 3,020,689 | 2/1962 | Luther | 53/503 X |
| 3,282,020 | 11/1966 | Smith | 141/95 X |
| 4,675,660 | 6/1987 | Boscolo | 141/95 X |
| 4,676,098 | 6/1987 | Erlenkamper et al. | 141/95 X |
| 4,809,485 | 3/1989 | Nielsen | 53/503 |
| 4,958,665 | 9/1990 | Iwano | 53/503 X |
| 5,105,661 | 4/1992 | Sekita et al. | 141/95 X |

*Primary Examiner*—James F. Coan
*Attorney, Agent, or Firm*—Burns, Doane, Swecker & Mathis

[57] ABSTRACT

Methods and apparatuses for registering the level of contents in a packaging material tube which is formed in a packaging machine and is continuously supplied with contents and sealed-off transversely for the formation of individual packaging containers filled with contents are previously known and include, int. al. sensing devices located in the packaging material tube. In order to facilitate cleaning and sterilization of the packaging machine, use is made, in the method according to the present invention, exclusively of sensing devices located outside the packaging material tube (6), in the form of a device (15) sensing the outside temperature of the packaging material tube (6), the device being, via a master unit (17), connected to a feeder device (12) which, in response to the signal of the sensing device (15) via the master unit (17), is regulated so that contents (18) are supplied at a suitable rate to the lower end of the packaging material tube (6).

10 Claims, 2 Drawing Sheets

METHOD AND AN APPARATUS FOR REGISTERING A LEVEL OF CONTENTS

TECHNICAL FIELD

The present invention relates to a method for registering the level of contents in a packaging material tube which, during a downward movement through a packaging machine, is supplied with contents by means of a feeder device which is controlled by a level sensing unit. The present invention also relates to an apparatus for reducing the method into practice in a packaging machine of the tube-forming type, the apparatus essentially comprising a feeder device and a level sensing unit.

The method and the apparatus according to the present invention are particularly intended to be employed in packaging machines of the type which forms, from a packaging material web (of, for example, laminated fibre material coated with thermoplastic layers), a substantially vertical, liquid-tight packaging material tube which is progressively filled with liquid or pumpable contents, for example milk or the like. After filling with contents to the desired level, the filled packaging material tube is divided at its bottom end by repeated transverse seals and subsequent incisions so that substantially cushion-shaped packaging containers are formed which are then possibly form processed into parallelepipedic shape. A packaging machine of this type is described in greater detail in European Patent EP 25235 to which reference is made.

BACKGROUND ART

In order to ensure that the supply of contents to the packaging material tube takes place at the desired rate, i.e. a rate which ensures that the quantity of contents packed in each individual packaging container is replenished so that the level of contents in the tube is kept substantially constant, packaging machines of the above-mentioned type are normally provided with some form of level maintenance device which senses the level of the contents and controls the supply of contents. Prior art level maintenance devices of this type utilize a float located in the material tube, the position of the float being sensed and utilized for controlling, via a valve or pump, the supply of contents to a filler pipe extending downwards through the upper, open end of the packaging material tube. The sensing of the position of the float can take place either with the aid of devices disposed within the packaging material tube or with the aid of external sensing devices which electrically control a contents supply valve (see, for example European Patent EP 322.001).

The prior art types of level maintenance devices which have hitherto been employed in the art all make use of one or more components disposed in the packaging material tube, for example the above-mentioned float, ultrasonic sensors, or level probes. However, in packaging machines of the above-mentioned type (which may possibly also be called upon to operate under aseptic, i.e. sterile, conditions), reasons of hygiene dictate the desirability of reducing the number of mechanical parts located inside the packaging material tube. With a minimum of mechanical parts inside the packaging material tube, i.e. in direct contact with the contents, cleaning of the packaging machine will be considerably facilitated, which ensures that a high standard of hygiene can be maintained. Thus, it is desirable in the art to devise a method for registering the level of the contents in this type of packaging machine, the method making it possible to register the level of contents from the outside of the packaging material tube and without direct contact with the contents located inside the packaging material tube.

OBJECTS OF THE INVENTION

One object of the present invention is, therefore, to devise a method for registering the level of contents in a packaging material tube, this method rendering wholly unnecessary the insertion of sensing devices into the bottom end of the packaging material tube.

A further object of the present invention is to devise a method of the above-outlined type which makes for a dependable and reliable sensing of the level of the contents from the outside of the tube also on those occasions when external circumstances, such as varying temperature conditions, impede dependable level registration.

Yet a further object of the present invention is to devise a method for level registration which obviates those drawbacks inherent in prior art methods and which makes possible simple and uncomplicated sensing.

SOLUTION

The above and other objects have been attained according to the present invention in that a method of the type mentioned by way of introduction has been given the characterizing feature that the level sensing unit registers the position of the surface of the contents by means of temperature sensing device disposed on the outside of the tube, in response to a temperature change in the packaging material caused by the contents themselves.

It is a further object of the present invention to devise an apparatus for carrying the method into effect, the apparatus being simple and reliable and not suffering from any of the above-mentioned drawbacks associated with prior art apparatuses.

Yet a further object of the present invention is to devise an apparatus which makes it possible to carry out a registration of the level of the contents in the packaging material tube without the aid of parts located in the lower region of the tube and coming into contact with the contents therein.

Still a further object of the present invention is to devise an apparatus which is constructed from known, reliable components and which, therefore, is but modestly expensive to produce and maintain.

Yet a further object of the present invention is to devise a level sensing apparatus which includes means for ensuring an accurate reading even under difficult sensing conditions and adaptable to meet different requirements.

SOLUTION

The above and other objects have been attained according to the present invention in that an apparatus of the type mentioned by way of introduction has been given the characterizing feature that the level sensing unit includes a temperature sensing device which is placed on the outside of the tube.

ADVANTAGES

By basing the method and the apparatus according to the present invention on a registration of the temperature differences which can be sensed from the outside of the tube between the lower region of the tube filled with contents and the gas-filled region of the tube located higher up, the sensing operation can take place entirely from the outside of the packaging material tube, no mechanical sensing parts needing to be inserted in the lower end of the packaging material tube, which greatly facilitates washing and cleaning of the packaging machine and ensures that a high standard of hygiene—acceptable also for aseptic production—can be maintained.

BRIEF DESCRIPTION OF THE ACCOMPANYING DRAWINGS

One preferred embodiment of the method and the apparatus according to the invention will now be described in greater detail hereinbelow, with particular reference to the accompanying, schematic Drawings which show only those details essential to an understanding of the invention. In the accompanying Drawings:

FIG. 1 schematically illustrates in perspective selected parts of a packaging machine of known type, in which the method and the apparatus according to the present invention are employed; and FIG. 2 shows, on a larger scale and partly in section, the apparatus according to the present invention placed at the lower end of the packaging material tube according to FIG. 1.

DESCRIPTION OF PREFERRED EMBODIMENT

Figure 1:
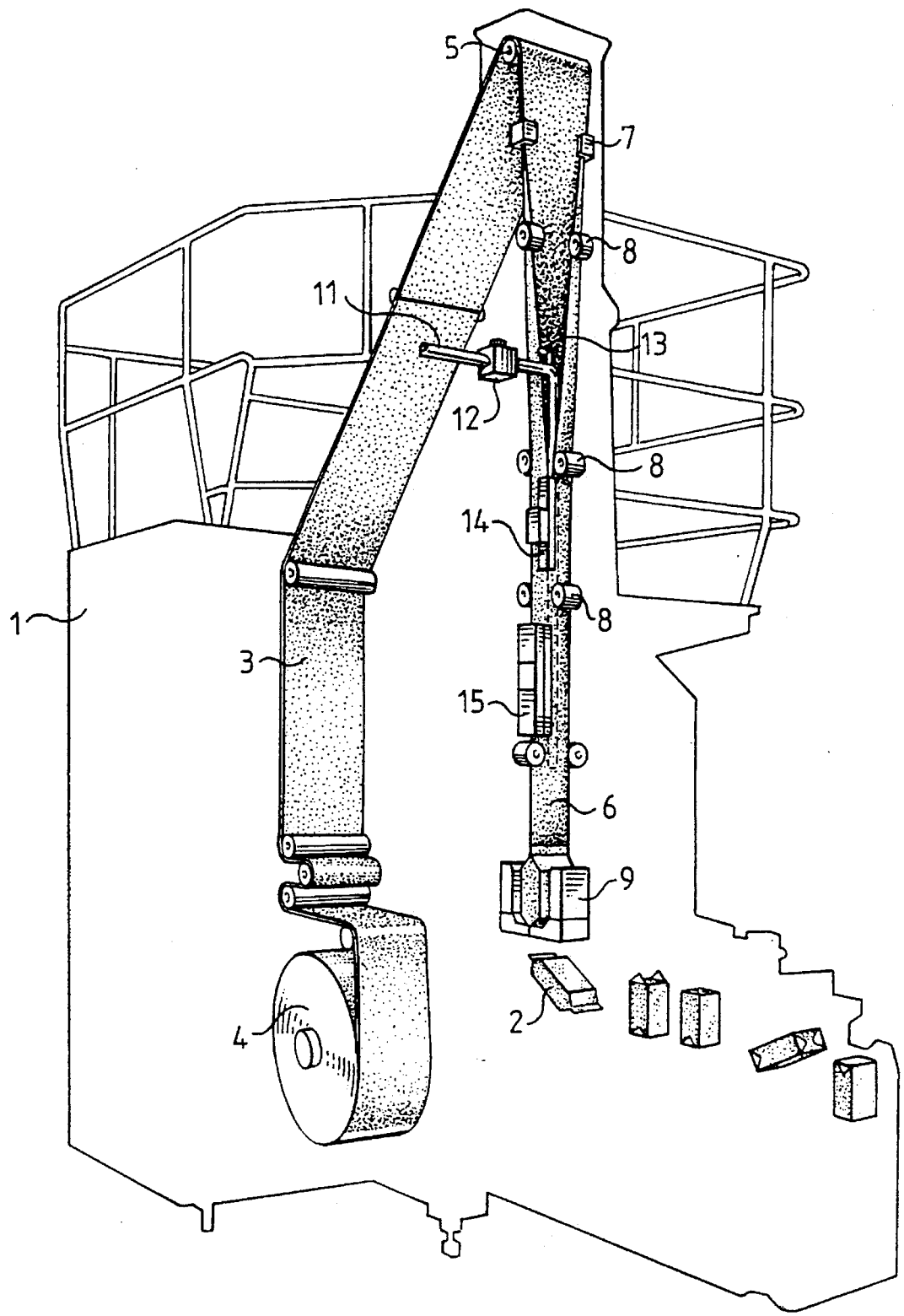

The method and the apparatus according to the present invention will be described hereinbelow in one embodiment which is suitable for employment in a packaging machine of known type, for example of the type described in European Patent EP 25235, to which reference is made. This known type of packaging machine 1 (FIG. 1) produces separate, filled packaging containers 2 from web-shaped packaging material 3 which is supplied to the machine in the form of a packaging material reel 4. The packaging material web is led from the packaging material reel 4 via per se known guide members, eg. rollers, guides or the like, substantially vertically upwards until it reaches a bending roller 5 placed at the upper region of the packaging machine 1 and deflecting the packaging material web 3 so that it runs substantially vertically downwards through the machine. On its downward displacement from the bending roller 5, the packaging material web 3 is progressively converted into a packaging material tube 6, this taking place with the aid of guide members 7 abutting against the edges of the web 3, as well as forming rollers 8. Both of the longitudinal edges of the packaging material web 3 will hereby be progressively caused to overlap one another and be sealed to form a liquid-tight longitudinal lap joint or seam running in the longitudinal direction of the packaging material tube 6. The lower end of the packaging material tube 6 is hereafter filled with contents (as will be described in greater detail hereinbelow), whereafter the packaging material tube is reformed into four-sided cross sectional configuration with the aid of reciprocating forming and sealing devices 9, and is sealed in transverse regions so that individual, liquid-tight packaging containers 2 are realized. The packaging containers 2 are separated from one another and possibly also subjected to a subsequent forming processing to obtain the desired final shape, for example parallelepipedic.

A filler pipe 11 extends vertically through the packaging material tube 6, the filler pipe discharging a slight distance above that point at which the forming and sealing devices 9 process and seal off the packaging material tube 6. The filler pipe 11 departs from the packaging material tube 6 at the upper end thereof where it is in communication, via a feeder device 12 for controlling the flow of contents, with a source of contents (not shown) eg. a tank. The feeder device 12 may be a valve, a pump or some other suitable means for controlling the flow of contents from the tank to the packaging material tube 6. At the upper, open end of the packaging material tube 6, there is disposed a heating device which may be in the form of a gas supply pipe 13 which extends into the packaging material tube and discharges a slight distance above the surface of the contents located in the packaging material tube. Instead of the gas supply pipe 13 (or as a complement to the gas supply pipe 13), the heating device may comprise a heater element 14 which is placed substantially flush with that point at which the packaging material tube 6 is formed in that both of the longitudinal edges of the packaging material web 3 are brought together and sealed to one another. The heating device may possibly also serve as a heat source on heat sealing of the edges of the material web 3, as may be the case when the packaging material 3 is coated with external layers of thermoplastic, eg. polyethylene, which is used for heat sealing of the material edges.

Figure 2:
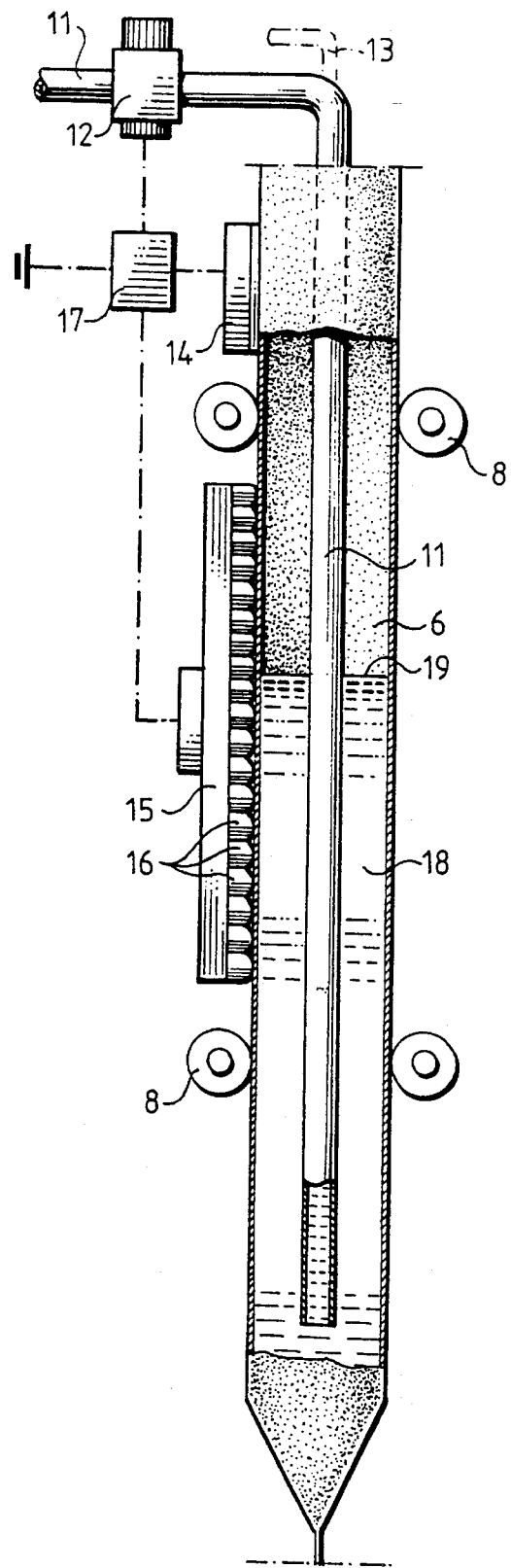

A distance beneath the heating device, there is located a temperature sensing device 15 which is disposed substantially in line with the heater element 14 and a slight distance above the bottom, open end of the filler pipe 11. FIG. 2 shows in greater detail how the temperature sensing device 15 includes a number of vertically superposed temperature sensors 16 which may be semiconductor elements, IR sensors, laser temperature meters, contactor devices or other known types of temperature sensors which are located in direct contact with the packaging material or a slight distance therefrom. The temperature sensing device 15 is electrically connected to a master unit 17 which is of known type and is operative to control the feeder device 12 in response to the input signal from the temperature sensing device 15. Like the heating device 14, the master unit 17 is also connected to a current source.

In the partly cut-away packaging material tube 6, it is shown how the filler pipe 11 extends vertically downwards to discharge a slight distance above that point at which the tube is sealed transversely. The lower end of the packaging material tube is, as was mentioned previously, filled with contents 18 whose level or surface 19 is indicated by a broken line.

When the illustrated packaging machine is in operation, the packaging material web 3 is advanced through the machine with the aid of the forming and sealing devices 9 which reciprocate in both the horizontal and vertical directions. In such instance, the packaging material web 3 is fed from the packaging material reel 4 in order, via known guide means, to reach the bending roller 5 whereafter the web is led vertically downwards and reformed into the packaging material tube 6 in the previously described manner. The repeated division of the packaging material tube 6 into individual packaging containers 2 which, in this instance, proceeds at the lower end of the tube 6 naturally entails that both the packaging material web 3 and the contents 18 located in the packaging material tube 6 will be consumed. The consumed contents are replenished continuously via the filler pipe 11, which ensures a flow of contents from the source of contents (not shown) to the lower end of the packaging material tube 6. In this instance, it is vital that the flow of contents be regulated and adapted to the rate of consumption so that the level 19 of the contents is always kept substantially constant at such a distance above the forming and sealing devices 9 that each manufactured packaging container 2 will be completely filled with contents, i.e. has no head room or space for gas or air. At the same time, it is essential to ensure that the level 19 of the contents does not rise to such a height as to approach the upper portion of the packaging material tube which is still not longitudinally sealed, which would, of course, result in leakage of contents.

The registration and regulation of the level 19 of the contents take place according to the present invention entirely from the outside of the packaging material tube 6. This is possible in that the external temperature of the packaging material 3 is influenced by its surroundings in such a manner that the packaging material tube, where it is located in direct contact with the contents, is at considerably lower temperature than the upper region of the packaging material tube into which no contents have as yet been fed and, as a result, its inside is in contact with a gaseous medium, for example air. Since the packaging material normally consists of paper/plastic laminate (and possibly also aluminium foil) and is relatively thin (0.3 mm), the temperature on its outside is rapidly affected in a registrable manner on contact with the contents in the packaging material tube 6. The temperature sensing device 15 placed at the outside of the tube 6 may, as a result, sense the level of the contents on the basis of the temperature change in the packaging material caused by the presence of contents 18 (the thermal or IR radiation from the material). More precisely, this takes place in the illustrated embodiment by means of the temperature sensors 16 which, for example, may be of the IR sensing type and are placed such that the transition from "warm" to "cold" tube outer surface is sensed within that vertical region which the temperature sensing device 15 embraces. The relationship between the number of temperature sensors 16 which sense a "warm" tube surface and a "cold" tube surface, respectively, determines the value of that signal which reaches the master unit 17 via the conductor. With the assistance of this signal, the master unit 17 can determine whether adjustment of the feeder device 12 is necessary and, in such an event, ensure that the feeder device 12 controls the flow to the lower end of the filler pipe 11 in such a manner that the level 19 of the contents is kept within desired limits. The feeder device 12 may be a simple, adjustable contents valve or a pump of variable capacity.

On filling of most of those types of contents for which the described packaging machine is intended (eg. milk, cream, juice or other similar consumer products), the contents are, on being led to the packaging machine, at a temperature of between 0° and 5° C. The difference between this temperature and room temperature is normally sufficient to reliably detect the level of the contents from the outside of the packaging material tube 6, but in order to ensure an exact read-off even under severe or unfavourable conditions (contents temperature up to approx. 50° C.), it may be necessary to ensure that at least that portion of the packaging material tube 6 at which the temperature sensing device 15 reads off the temperature is at sufficiently elevated temperature for the contrast between "warm" tube surface and "cold" tube surface to be adequate. According to the present invention, this may be achieved with the aid of the heater element 14 which is, for example, of the electric or hot air type and is placed at a slight distance straight above the temperature sensing device 15. Hereby, a strip-shaped region of the outside of the packaging material tube 6 will be progressively heated before it reaches the temperature sensing device 15, typically to approx. between 60° and 110° C., which, even when filling relatively warm contents 18, reliably creates a sufficient contrast for the temperature sensing device 15 to be able to sense the level 19 of contents inside the tube. The heater element 14 may possibly be placed so that it heats both of the longitudinal edges of the packaging material web 3 immediately before these are brought together and sealed together to form the longitudinal lap seal or seam of the packaging material tube 6.

As an alternative or complement to the exterior heater element 14, the gas supply pipe 13 may be employed for leading a heated gas—for example sterile air—into the interior of the packaging material tube 6, which ensures that the portion of the packaging material tube 6 which has still not yet come into contact with the contents 18 will reach an elevated temperature sufficient for read-off by the temperature sensing device 15, eg. between 50° and 100° C. The supplied gas or sterile air is led via the gas supply pipe 13 to that portion of the packaging material tube 6 which is located immediately above the level 19 of the contents, whereafter the gas flows upwardly and out through the upper, open end of the packaging material tube 6, this thereby simultaneously ensuring that no contaminated ambient air (if any) can reach into the contents 18 located in the packaging material tube 6.

With certain types of contents, for example fruit juice, so-called hot filling is sometimes employed, which entails that the product is filled at elevated temperature for example of the order of magnitude of between 70° and 95° C., preferably 85° C., which results in the destruction of yeast and mould. In this instance, the temperature change will, of course, be the opposite, i.e. a relatively "cold" packaging material is heated up by the product in a registrable manner. On condition that the temperature difference is sufficiently great, the method and the apparatus according to the present invention may also be employed in this type of filling after the necessary adjustment and adaptation (eg. cooling instead of heating at the upper end of the tube).

The embodiment of the method and apparatus according to the present invention which has been described above is also suitable for use in those versions and designs of known packaging machines which are of the aseptic type and manufacture sterile packaging containers, i.e. packaging containers which impart a long shelf life to previously heat-treated contents. This type of packaging machine fundamentally operates in the same manner as the machine illustrated in FIG. 1, but features additional devices for preventing contaminants from reaching the contents and infecting them, such as hoods encasing the packaging material web 3 and the packaging material tube 6 and supplied with sterile air at excess pressure. In all types of packaging machines, but in particular in those types which manufacture sterile packages, it is of crucial importance that those parts which come into direct contact with the contents can be regularly cleaned and sterilized in an efficient manner, which is considerably facilitated by the method and the apparatus according to the invention, which, unlike prior art similar designs and constructions, do operate wholly without parts of the level sensing unit needing to come into contact with the contents proper, i.e. be placed at the lower end of the packaging material tube 6. Extremely stringent standards of hygiene will hereby also be achieved, for which reason the method and the apparatus according to the invention are eminently well suited for use in aseptic packaging machines.

While this invention has been illustrated and described in accordance with a preferred embodiment, it is recognized that variations and changes may be made therein without departing from the invention as set forth in the claims.

What is claimed is:

1. A method of determining the level of contents in a packaging material tube which, during a downward movement of the packaging material tube through a packaging machine, is supplied with contents from a feeder device, the feeder device being controlled by a level sensing unit, comprising the steps of:

sensing, with at least one temperature sensing device of a level sensing unit, a location on the packaging material tube at which a temperature change occurs due to the presence, in the packaging material tube, of the contents in the packaging material tube, the temperature change being indicative of the position of the level of contents in the packaging material tube;

continuously adjusting a temperature of the packaging material tube at an upper end thereof to a temperature different from a temperature of the contents by blowing gas at a temperature different from the temperature of the contents against the packaging material tube.

2. The method as claimed in claim 1, wherein, during the temperature adjusting step, the packaging material tube is moved past a heating device which heats the outside of the tube prior to the packaging material tube being moved past the temperature sensing device.

3. The method as claimed in claim 1, further comprising the step of controlling an amount of contents supplied to the tube in response to the position of the level of the contents in the packaging material tube determined by the level sensing unit.

4. An apparatus for determining a level of contents filled in a packaging material tube by a feeder device in a tube-forming packaging machine, the apparatus comprising:

a temperature sensing device, the temperature sensing device sensing a temperature of the packaging material tube; and a blower disposed upstream, in a direction of movement of the packaging material tube, from the temperature sensing device, the blower blowing gas on the packaging material tube at a temperature different from a temperature of contents filled in the packaging material tube.

5. The apparatus as claimed in claim 4, further comprising a feeder device for filling the contents into the packaging material tube, and a control device that controls an amount of contents fed by the feeder device in response to one or more signals from the temperature sensing device, the signals being indicative of a level of contents in the tube.

6. The apparatus as claimed in claim 4, wherein the temperature sensing device includes a plurality of temperature sensors.

7. The apparatus as claimed in claim 4, further comprising a heating device disposed upstream from the temperature sensing device.

8. The apparatus as claimed in claim 7, wherein the heating device is disposed outside of the packaging material tube.

9. The apparatus as claimed in claim 4, wherein the blower includes a supply pipe that discharges inside of the packaging material tube.

10. The apparatus as claimed in claim 4, wherein the temperature sensing device includes one or more temperature sensors of the IR type.

\* \* \* \* \*